United States Patent [19]
Kohler

[11] 3,851,166
[45] Nov. 26, 1974

[54] BOAT UTILITY LIGHT APPARATUS
[76] Inventor: Theodore D. Kohler, 84-965 Farrington Hwy., Apt. 815, Waianae, Hawaii 96792
[22] Filed: Mar. 7, 1974
[21] Appl. No.: 449,100

[52] U.S. Cl............... 240/57, 240/7.5, 240/41 R, 240/41 SB, 240/52.1, 240/61.12
[51] Int. Cl............................................. B60q 1/00
[58] Field of Search .......... 240/41 R, 41 SB, 6.4 R, 240/41.55, 52 R, 52.1, 7.5, 26, 61.12, 57; 43/17.5

[56] References Cited
UNITED STATES PATENTS

| 2,230,458 | 2/1941 | Hummert | 240/61.12 |
|---|---|---|---|
| 2,510,320 | 6/1950 | Sauer | 240/61.12 |
| 2,699,491 | 1/1955 | Sternaman | 240/41 SB |
| 2,734,997 | 2/1956 | Frady | 240/52 R |
| 2,796,515 | 6/1957 | Waskie | 240/52 R |
| 2,908,811 | 10/1959 | Duddy | 240/52.1 |
| 2,921,182 | 1/1960 | Taylor | 240/52.1 |
| 3,064,122 | 11/1962 | Reeder | 240/7.5 |
| 3,309,512 | 3/1967 | Conley et al. | 240/52 R |
| 3,519,811 | 7/1970 | Jacobs | 240/52 R |

FOREIGN PATENTS OR APPLICATIONS

| 1,139,560 | 1/1969 | Great Britain | 240/26 |
|---|---|---|---|

Primary Examiner—Richard L. Moses
Attorney, Agent, or Firm—James C. Wray

[57] ABSTRACT

A boat utility light apparatus employs a sealed beam automobile-type headlamp encased in a weather-tight housing and mounted on a telescoping member. The telescoping member is, in turn, attached to a clamp assembly which is tightened about a suitable structural member of the boat. The light is powered by electricity from the boat's storage battery which passes through a power conductor equipped with a dimmer control to regulate the brightness of the light.

7 Claims, 3 Drawing Figures

BOAT UTILITY LIGHT APPARATUS

BACKGROUND OF THE INVENTION

The present invention is a portable weather-tight boat utility light equipped with an adjustable lamp support. The prior art contains disclosure of a variety of boat lamps, adjustable lamp supports, reflectors, and weather-tight lamp housings. A need exists for a boat utility light apparatus which is easily fabricated from presently manufactured components and provides an adjustable light source.

A collection of devices of the type known in the prior art is found in the official U.S. Pat. Office classification of patents, particularly in class 240, subclasses 6.4, 41.55, 52, and 52.1; and class 43, subclass 17.5. Examples of such devices are found in U.S. Pat. Nos.: 3,720,824; 3,626,173; 3,519,811; 3,464,139; 3,113,729; 3,058,746; 2,921,182; 2,796,515; 2,734,997; and 1,812,632. U.S. Pat. No. 3,502,861 shows a transom clamped boat light. U.S. Pat. No. 3,113,729 discloses a stern mounted light reflector. U.S. Pat. No. 3,058,746 describes the use of wingnuts in an extension lamp.

U.S. Pat. No. 2,921,182 shows a self-adjusting boat light with wing nuts.

U.S. Pat. No. 2,796,515 shows an extensible vehicle lamp with a telescoping feature, but without wingnuts.

U.S. Pat. No. 2,734,997 describes an extensible boat lamp.

O-rings for sealing purposes are found in U.S. Pat. Nos. 3,519,811; 3,626,173; 3,720,824; and 1,812,632.

A need exists for an easily and cheaply fabricated boat utility light which is both portable and adaptable to a wide variety uses on board a boat.

SUMMARY OF THE INVENTION

The present invention concerns a boat utility light principally intended for use during night fishing. The light has a clamp for attachment to a boat transom or other structural member on the boat. A telescoping, pivot mounted member provides adjustable support for the incandescent lamp and housing. The lamp itself is a sealed beam automobile-type lamp which is enclosed by a weather-tight housing. Waterproofed power conductor lines connect the terminals of the lamp to a source of electric power.

In a preferred embodiment of the present invention, the weather-tight housing consists of a hollow, approximately hemispheric fairing which is formed with a circular aperture in the planar face of the hemisphere. The aperture and hollow within the fairing are of sufficient dimensions to accept the sealed-beam lamp. Light from the lamp is directed outward through this circular aperture.

An O-ring seat is attached to the fairing adjacent to and concentric with the circular aperture in the fairing.

The seat is annular in shape and is formed with an inner diameter smaller than the diameter of the circular aperture. The seat is recessed from the mouth of the fairing. An inner "O" ring is positioned between the O-ring seat and the protruding circumferential edge of the glass envelope of the lamp. An outer O-ring is positioned about the lens of the lamp near its circumferential edge. A removable, annular locking ring is cocircularly attached to the portion of the fairing which defines the circular aperture. When so attached the locking ring forms a rim around the circular aperture and retains the outer O-ring by pressing the outer O-ring against the lamp.

In another preferred embodiment, a dimmer control is inserted in the lamp power line circuit to provide a means for regulating the light output of the lamp. The dimmer is mechanically fastened to the clamp assembly for stability. In one configuration, a power shut-off switch is incorporated into the dimmer control.

Waterproofed conductor lines extend out of the housing through weather-tight junctions so that the entire housing is rendered impervious to the elements. The conductor lines then pass to the dimmer control of the preferred embodiment. Attachment to the power source is affected by continuations of the power lines equipped with alligator clips which can be clamped onto the terminals of the boat's storage battery.

In a preferred embodiment of the present invention, the clamp assembly is formed from a rectangular clamp channel with a horizontal plate attached to two, separated, parallel side plates which are downwardly disposed. A cross-section of the clamp channel takes the form of an inverted "U". A threaded aperture is tapped in one of the side plates perpendicular to the principal planes of the side plates. A threaded set screw is inserted through the threaded aperture until it engages the boat's structural member to which the light is to be clamped.

In a preferred configuration, the lamp housing is supported by a telescoping member consisting of two nesting tubular segments of decreasing diameter. A first clevis joint formed by two apertured lugs on the housing forms a pivotable attachment between a first, tubular, telescoping segment and the lamp housing. A first wing nut and bolt are employed to fasten the housing and clevis joint in a desired orientation with respect to the telescoping segments. A treaded aperture is formed in the distal end of a second tubular segment of larger diameter than the first segment. A set screw is inserted therein to fix the telescoping segments at the desired amount of extension. A proximal end of the second segment is pivotably attached to the clamp assembly by a second clevis joint similar to the above described, first clevis joint.

An object of the present invention is to provide a portable fishing light for boats.

Another object of the present invention is to provide a boat utility light fabricated from an ordinary automobile headlamp and other common stock components.

Another object of the present invention is to provide a boat utility light which is easily attached to structural members of the boat.

Another object of the present invention is to provide a boat utility light whose beam direction is freely and easily adjusted.

Another object of the present invention is to provide a boat utility light which derives its power from the boat's storage battery.

Another object of the present invention is to provide a boat utility light with an integrated dimmer control to regulate the amount of light produced by the lamp.

These and other objects and features of the invention are apparent from the disclosure, which includes the specification with the foregoing and ongoing descrip-

DETAILED DESCRIPTION OF THE DRAWINGS

Figure 1:
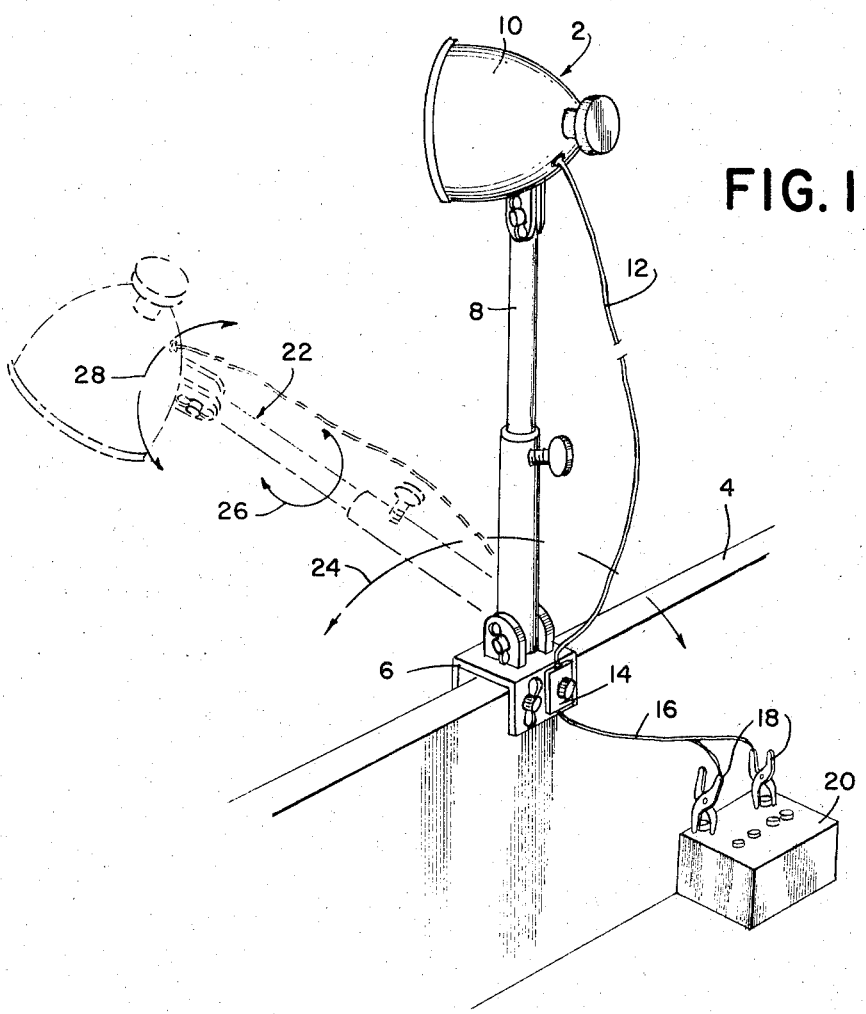
FIG. 1 is a perspective side elevation of the boat utility light apparatus of the present invention attached to a boat.

Referring to FIG. 1 a boat utility light apparatus is denoted generally by the numeral 2. The utility light apparatus is attached to a structural member of the boat 4 by means of clamp assembly 6. A telescoping member 8 supports weather-tight housing 10 and the sealed-beam lamp contained therein (not shown).

Power conductor line 12 supplies the utility light with electric power. In a preferred configuration, the electric power is regulated by dimmer control 14, which is electrically connected to the sealed-beam lamp. In another preferred embodiment, the utility light apparatus is directly connected to an independent source of power on board boat such as storage battery 20. The connection is accomplished by dimmer input cables 16 equipped with alligator clips 18 which are readily attached to terminals on the boat's storage battery.

A possible reorientation of the lamp is shown in phantom and denoted by numeral 22. Arrows 24, 26 and 28 schematically represent arcs through which the utility light can be reoriented. The structure which gives rise to these modes of reorientation are particularly described with reference to FIG. 2.

Figure 2:
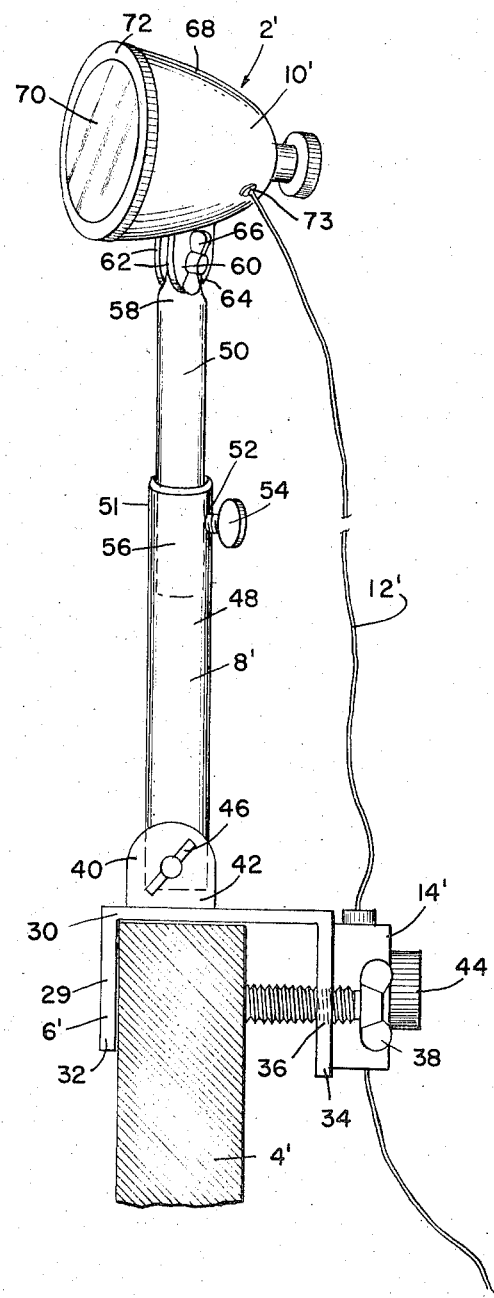
FIG. 2 is a side elevation of the boat utility light apparatus of the present invention showing the internal construction of the telescoping member and clamp assembly in phantom.

FIG. 2 is a side elevation of the present invention showing a portion of the internal construction of utility light apparatus 2'.

Clamp assembly 6' is depicted in its preferred configuration wherein it is composed of a clamp channel 29 with an inverted U-shaped cross-section. The clamp channel is, in turn, formed from a horizontal plate 30 attached to two, separated, parallel side plates 32 and 34. A threaded aperture 36 in side plate 34, receives set screw 38. When the utility light assembly is deployed, the clamp channel is fitted about an approximately rectangular, structural member of the boat 4'; and tightened down by means of the set screw 38.

Telescoping member 8' is attached to the horizontal plate of the clamp assembly by second clevis joint 40. Two aproximately parallel lugs 42 extend upward from the horizontal plate. A bolt and wing nut 46 serve to clamp and retain second tubular segment 48 between the parallel lugs of the clevis joint at the desired azimuthal angle.

A first tubular segment 50 slidably nests within second tubular segment 48. Variable lengths 56 (phantom) of a proximal portion of the first tubular segment can be inserted into the distal portion 51 of the second tubular segment 48 and engated therein by set screw 54. Threaded set screw 54 is inserted in tapped aperture 52 to fix the telescoping member at the desired point of extension. A distal portion of tubular segment 50 is pivotably mounted to the lamp housing 10' by first clevis joint 60. The clevis joint itself is composed of two approximately parallel lugs 62 attached to disposed downward from the lamp housing. The first tubular segment is connected to the first clevis joint by a bolt 66 which passes through coaxial apertures in the lugs and in the wall of the tubular segment. The joint is tightened down by means of using nut 64.

The principal components of the lamp housing 2' are the hemispheric fairing 68, the lamp 70, and the locking ring 72. Power conductor line 12' loosely suspended between aperture 73 in the fairing and the dimmer control 14' attached to the clamp assembly. A power adjustment knob on the dimmer control is denoted by numeral 44.

Figure 3:
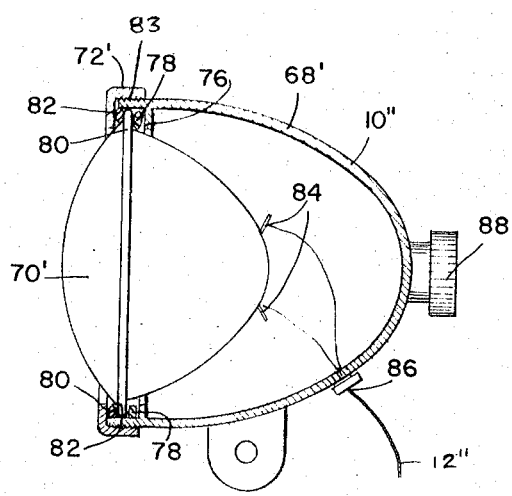
FIG. 3 is a cross-sectional detail showing the lamp housing of the boat utility light of the present invention.

FIG. 3 is a cross-sectional elevation of lamp housing 10'' of the boat utility light. An automobile-type lamp 70' is sealed within hemispheric fairing 68' by a combination of O-rings and concentric flanges. O-ring seat 76 is formed in the fairing adjacent to and concentric with the lamp lens aperture in the fairing. An inner O-ring 78 is positioned between the O-ring seat and the circumferential edge 80 of the lamp. An outer O-ring 82 is positioned around an exterior portion of the circumferential edge of the lamp. An annular locking ring 72' is removably attached to the fairing by means of inter-engaging, helical threads 83 on the ring and fairing. The locking ring is designed to form a retaining rim about the circular lens aperture in the hemispheric fairing which rim presses the O-ring seat to form a weather-tight seal. The weather-tight integrity of the lamp housing is also maintained by fairing seal 86, through which power conductor lines 12'' enter the housing. The ends of the power conductor lines are electrically connected to lamp power input terminals 84. A handle 88 is fastened to the fairing to facilitate adjustment of the utility light.

While the invention has been described with reference to specific embodiments, it will be obvious that modifications and variations may be constructed without departing from the spirit and scope of the invention. The scope of the invention is described in the following claims:

I claim:

1. A boat utility light apparatus comprising
   a sealed beam automobile-type lamp with power input terminals and a circular lens with a circumferential edge,
   a flexible power conductor line electrically connecting the power input terminals of the lamp to a source of electric power,
   a weather-tight housing surrounding the lamp, comprising
   a. a hollow, approximately hemispheric fairing which fairing is formed with a circular aperture in a planar face through which aperture light is projected from the lamp, and which fairing is formed with a power line aperture through which the power line is passed and sealed in place in a weather-tight fashion,
   b. an O-ring seat within the fairing adjacent to and concentric with the circular aperture in the fairing,
   c. an inner O-ring positioned between the "O" ring seat and the circumferential edge of the lamp,
   d. an outer O ring, positioned around an exterior portion of the circumferential edge of the lamp, and e. a removable, annular locking ring, coaxially attached to the fairing to form a rim surrounding the circular aperture in the hemispheric fairing, which locking ring is so dimensioned that the outer O-ring, the circumferential edge of the lamp, and the inner O-ring are pressed between the locking ring and the O-ring seat, a telescoping member, a distal end of which is attached to the housing so that it is capable of supporting the housing, and a clamp assembly attached to a proximal end of the telescoping member, which clamp assembly serves to fix the utility light apparatus to a structural component of a boat.

2. The boat utility light of claim 1 further comprising a dimmer control electrically connected in the power conductor line and mechanically attached to the clamp assembly; whereby, the brightness of the lamp is regulated.

3. The boat utility light of claim 2 further comprising a power shut-off switch in the dimmer control.

4. The boat utility light apparatus of claim 1 wherein the clamp assembly comprises a clamp channel with a horizontal plate attached to two, separated, parallel side plates which are downwardly disposed, one of which side plate is formed with a threaded aperture approximately perpendicular to a principal face of said side plate, and a set screw inserted into the threaded aperture in the side plate;

whereby, the clamp assembly is slipped about a structural member of a boat fastened in position with the set screw.

5. The boat utility light of claim 1 wherein the telescoping member comprises a first clevis joint attached to the lamp housing, which first clevis joint comprises two approximately parallel lugs each formed with a single, coaxial aperture; a first bolt capable of passing through both coaxial apertures; and a first wing nut fastened to the first bolt, a first tubular segment, a distal end of which is formed with a pair of coaxial apertures in its wall; whereby, the distal end of the first tubular segment is pivotably attached to the lamp housing and the first clevis joint by inserting the first bolt through the pair of coaxial apertures in the distal end of the first tubular segment, and by tightening the first wing nut, a second tubular segment of sufficient inner diameter so that varying lengths of the first tubular segment are freely inserted into a distal end of the second tubular segment, the distal end of which second tubular segment is formed with a threaded set screw aperture tapped through a wall of the second segment, and a proximal end of which second segment is formed with a pair of coaxial apertures in its wall, a set screw inserted in the set screw aperture of the second tubular segment to maintain the first and second tubular segments in a fixed spatial relationship with respect to one another, and a second clevis joint, attached to an upper face of the clamp assembly, which second clevis joint comprises two approximately parallel lugs each formed with a single, coaxial aperture; a second bolt passing through both coaxial apertures in the lugs; and a second wing nut fastened to the second bolt; whereby, the proximal end of the second tubular segment is pivotably attached to the clamp assembly and the second clevis joint by inserting the second bolt through the pair of coaxial apertures in the proximal end of the second tubular segment, and by tightening the second wing nut.

6. The boat utility light apparatus of claim 1 wherein the source of electric power is a boat's storage battery.

7. The boat utility light apparatus of claim 6 further comprising alligator clips at the ends of the flexible power conductor line for attachment to terminals of the boat's storage battery.

* * * * *